(12) United States Patent  
Watt

(10) Patent No.: US 9,135,148 B2  
(45) Date of Patent: Sep. 15, 2015

(54) METHOD, SYSTEM, AND COMPUTER-READABLE MEDIUM FOR GENERATING A TEST PROGRAM AND TEST SEQUENCE

(75) Inventor: David William Watt, Perth (GB)

(73) Assignee: SELEX ES LTD, Basildon, Essex (GB)

( * ) Notice: Subject to any disclaimer, the term of this patent is extended or adjusted under 35 U.S.C. 154(b) by 1379 days.

(21) Appl. No.: 10/512,694

(22) PCT Filed: Sep. 10, 2004

(86) PCT No.: PCT/GB2004/003882  
§ 371 (c)(1),  
(2), (4) Date: Oct. 27, 2004

(87) PCT Pub. No.: WO2005/026962  
PCT Pub. Date: Mar. 24, 2005

(65) Prior Publication Data  
US 2005/0193263 A1    Sep. 1, 2005

(30) Foreign Application Priority Data  
Sep. 15, 2003 (GB) .................................. 0321559.7  
Aug. 4, 2004 (GB) .................................. 0417323.3

(51) Int. Cl.  
*G06F 11/36* (2006.01)  
*G06F 11/32* (2006.01)

(52) U.S. Cl.  
CPC ........ G06F 11/3684 (2013.01); G06F 11/3664 (2013.01); *G06F 11/321* (2013.01); *G06F 11/3672* (2013.01); *G06F 11/3688* (2013.01); *G06F 11/3692* (2013.01)

(58) Field of Classification Search  
CPC ............ G06F 11/2221; G06F 11/2733; G06F 11/362; G06F 11/3684; G06F 11/3688; G06F 11/3692; G06F 11/3672; G06F 11/321  
USPC ........................ 714/38; 715/23; 717/124, 136  
See application file for complete search history.

(56) References Cited

U.S. PATENT DOCUMENTS

| | | | |
|---|---|---|---|
| 5,634,098 A * | 5/1997 | Janniro et al. | 714/38.1 |
| 5,913,023 A * | 6/1999 | Szermer | 714/38 |
| 6,397,378 B1 * | 5/2002 | Grey et al. | 717/175 |
| 6,415,396 B1 * | 7/2002 | Singh et al. | 714/38 |
| 6,775,824 B1 * | 8/2004 | Osborne et al. | 717/125 |
| 2003/0093736 A1 * | 5/2003 | Grey | 714/738 |
| 2003/0163788 A1 | 8/2003 | Dougherty | |

FOREIGN PATENT DOCUMENTS

EP    1 085 417 A2    3/2001

OTHER PUBLICATIONS

English language International Search Report (Forms PCT/ISA/220 and PCT/ISA/210) issued by the European Patent Office in corresponding International Application No. PCT/GB2004/003882; Rijswijk, The Netherlands, Oct. 19, 2004.  
English language International Preliminary Report on Patentability and attached Written Opinion (Forms PCT/IB/373 and PCT/ISA/237) issued by the International Bureau of WIPO in corresponding International Application No. PCT/GB2004/003882, Geneva, CH, Oct. 19, 2004.

* cited by examiner

*Primary Examiner* — John Breene  
*Assistant Examiner* — Lynda Dinh  
(74) *Attorney, Agent, or Firm* — Buchanan Ingersoll & Rooney PC

(57) ABSTRACT

Described herein is a method of generating a test program structure from test requirement data. The method comprises translating the test requirement data into a form suitable for execution within a test programming environment to generate a hierarchy of sequence files based on user supplied information. The test program comprises a plurality of Test Blocks and each Test Block comprises at least one Test.

18 Claims, 13 Drawing Sheets

METHOD, SYSTEM, AND COMPUTER-READABLE MEDIUM FOR GENERATING A TEST PROGRAM AND TEST SEQUENCE

RELATED APPLICATION

This application claims priority as a continuation application under 35 U.S.C. §120 to PCT/GB2004/003882 which was filed as an International Application on Sep. 10, 2004, designating the U.S., and which claims priority to Great Britain Application 0417323.3 filed in Great Britain on Aug. 4, 2004, which claims priority to Great Britain Application 0321559.7 filed in Great Britain on Sep. 15, 2003. The entire contents of these applications are hereby incorporated by reference in their entireties.

FIELD

The present invention relates to improvements in or relating to test systems or programs.

BACKGROUND

Currently, test systems or programs are devised in accordance with the particular piece of equipment or system to be tested, and tend to be require a great deal of manual effort both in devising the test system or program and its implementation.

The test system or program which is to be executed to test a particular piece of equipment or a system is first defined in a test requirement document (TRD). The TRD is then used to define the test program structure in a suitable test programming environment (for example, a suitable test programming language). This step is carried out by a person skilled in the test programming environment and may require several iterations before the defined test program structure is completed.

The next step in the process of defining the test system or program is either to generate a test script or to write test code from the test program structure. In both cases, the test script or test code must be carried out by a skilled person. In the former case, the script is reviewed and, if amendments are needed, the script is revised. This process may take several iterations to produce a satisfactory script which allows the test program to run and produce sensible results. In the latter case, the test code will include various header files, limit files, test files etc. Each file type will need to be reviewed and validated individually in order to produce a test program which will run and produce sensible results.

Both generating a test script and writing test code are labour-intensive as there is no guarantee that the test program will be correct the first time and several iterations may need to be carried out to produce the final test program.

Furthermore, for each particular piece of equipment or system to be tested, a different test program needs to be generated, and subsequent additions to the TRD may result in the whole process being repeated from scratch.

SUMMARY

It is therefore an object of the present invention to provide a method for devising test systems or programs which overcomes the disadvantages associated with current test systems described above.

In accordance with one aspect of the present invention, there is provided a method of automatically generating a test program structure from test requirement data which comprises translating the test requirement data into a form suitable for execution within a test programming environment.

The method of the present invention creates the test program structure in a specified known format in accordance with the test programming environment.

Advantageously, the test programming environment comprises a TestStand™ environment. (TestStand™ is a trademark of National Instruments Corporation and refers to a specific format.)

Preferably, the method further includes defining at least one test block in accordance with the test requirement data. At least one test is defined for each test block, and a plurality of codes are defined for each test.

Additionally, an interface with another test programming environment may also be provided.

In accordance with another aspect of the present invention, there is provided a computer program for carrying out the method described above.

The computer program may be stored on a suitable carrier, for example, a CD-ROM or a disk.

The present invention has the advantage that a user needs no specialist knowledge of the particular script which is used to generate the particular Test Program. It provides a rigid and consistent method of generating Test Programs.

The method of the present invention can be used to create a test program sequence for any system, for example, an avionics related system.

This removes the labour-intensive part of generating the test program sequence.

DESCRIPTION OF THE DRAWINGS

For a better understanding of the present invention, reference will now be made, by way of example only, to the accompanying drawings in which:—

DETAILED DESCRIPTION

The method of the present invention generates a hierarchy of sequence files which are based on user supplied information. A key component of the invention is the special to type editor through which the user enters not only the information necessary to identify the sequence files and their version, but also a number of test specific parameters required to produce the sequence hierarchy of the test program. The editor supports the definition of parameters according to the position they appear within the hierarchy.

The user defines an outer level, called a Block, before completing the details of the tests it contains. Once the test program information has been entered the sequence files are generated, containing the appropriate "steps" of the test executive. Generation of the sequence files occurs in accordance with a predefined set of rules. A target directory is specified through the use of an environmental variable of a Windows Operating System.

It is to be noted that it is not necessary to fully define the complete test program definition as partial generation is supported by the invention. This allows portions of the test program to be defined as long as the user has not modified the generated sequences using the test executive. Moreover, it is not necessary to generate the test program once the data has been entered. The invention allows the option of saving this data, and its subsequent retrieval for the test program to be generated at a later date.

The method of the present invention is carried out by a program which comprises an executable application called TPSWizard.exe. The .exe file is distributed with a number of template and utility TestStand™ sequences and two text files. These files contain the general 'skeleton' format of a test program, which are copied and modified by the program to construct the test program sequences.

Figure 1:
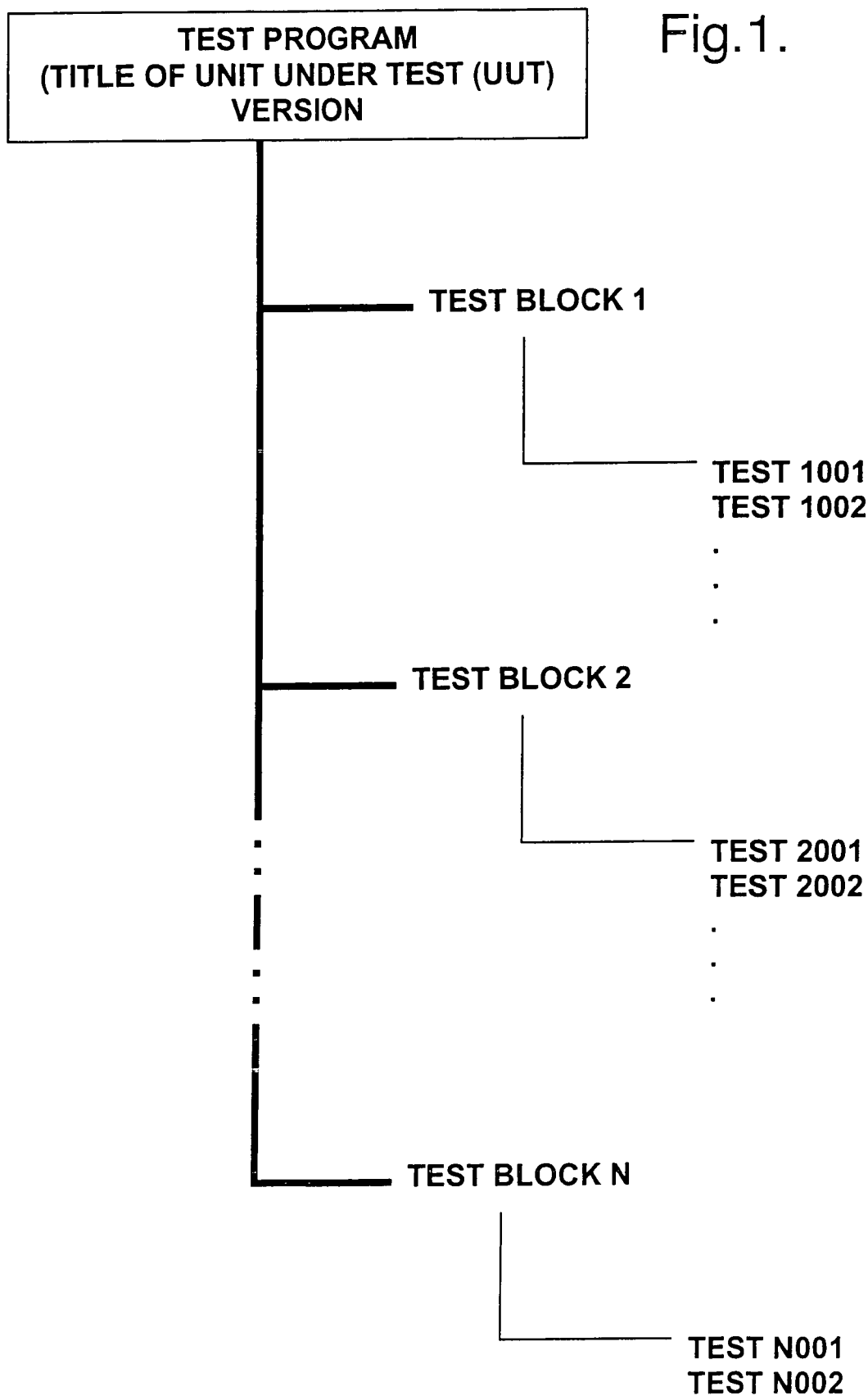
FIG. 1 illustrates how a test program is generated.

FIG. 1 illustrates the structure of a Test Program for a Unit Under Test (UTT). The Test Program comprises a plurality of Test Blocks as shown—each Test Block comprising one or more Tests.

On execution of the program, the user enters the target name, version, description and drawing/part number of the Test Program into the Information Dialog. This information is used to construct the base name and directory name of the target files to make them unique within the test system. Once entered, the user then has access to a dialog that allows specification of the Test Block names and descriptions. These are held internally as a linked list of blocks and descriptions.

On creation of a new Test Block, a single new entry is also created in the corresponding test linked list and allows the user to start specifying individual tests within that list. Blocks can be moved up and down within the block list to change the order of the blocks within the sequence. Once moved, the application recalculates the test numbers of the tests within each block to reflect its new position within the hierarchy and updates the linked lists accordingly.

To complete an individual test entry, the user enters information into the test editor dialog. The test number is assigned by the program. However, the Test Name, Adapter type, Test type, Comparison type, Lower limit, Upper limit, Expected string, Units, On Fail destination, On Pass destination and Test Requirement Document reference, must be entered by the user. By selecting 'OK' the information is then stored in a record structure that is added to the linked list of tests for that block.

Similar to Blocks, Tests can be moved up and down within the individual Test Block and can be deleted if necessary. Such operations cause the linked list to be updated to reflect the changes. Should the user want to save the information entered, they can do so by selecting 'Save' or 'Save As' from the main application menu. The data from the Wizard is decanted into a file using a mono-alphabetic substitution cipher rendering it unreadable by the user. This file can be retrieved at a later date by selecting 'Open' to allow editing or expansion of the test information. During the retrieval process, the encoded format is translated back, and the linked lists re-constituted.

When the user invokes the 'Generate TPS' option on the main dialog, the application references the registered TestStand™ ActiveX API to obtain a connection (handle) to a new instance of the TestStand™ Engine. Once connected the template files are copied to the target directory and renamed according to the Information supplied in the Information dialog. In situations where multiple Blocks are defined, then multiple sub-sequence Test Block files are created within the target directory. The linked lists are then traversed and the TestStand™ Engine API is utilised to create the required hierarchy of sequences and steps to realise the test program.

In addition to tests, pre- and post-expressions, labels and DLL calls are derived and inserted with the sequences to complete a significant proportion of the test program. On completion of the generation process, the application releases all handles to sequences, sequence files and TestStand™ Engine.

The application also creates a 'blockselect.ini' information file that reflects the number of blocks (excluding the first block that contains pre-defined pre-performance tests). This file is used by the system software component DLL Block-Select.dll referenced in the main body of the test program. A diagnostic text file is also copied to the target directory but is not changed internally by the application, this is manually edited by the user.

Once completed, the application prompts the operator if they would like to invoke TestStand™ to open the sequence files for further, manual editing.

The template files are described below:

| File | Purpose |
| --- | --- |
| LimitsFile.txt | Template text file copied to the target directory and modified by the TPS Wizard to hold all applicable limits. |
| Diagnostics.txt | Template text file copied to the target directory but not modified by the TPS Wizard. The text file is a look up table, which cross-references a Diagnostic Message code to the text to be displayed on test failure. |
| ReadFormattedText.seq | Utility TestStand ™ sequence file copied to the target directory but not modified by the TPS Wizard. Reads formatted data from a text file - used to retrieve diagnostic messages. The user does not need to modify the copied file. |
| MessagePopUps.seq | Utility TestStand ™ sequence file copied to the target directory but not modified by the TPS Wizard. This sequence file contains standard message popup steps. The user does not need to modify this file but may wish to add his own bespoke message pop-ups to the standard ones given. |
| Main.seq | Template TestStand ™ sequence file copied to the target directory and modified by the TPS Wizard. The copied file is the main entry point to the test program. The user may need to edit this file in the Sequence Editor to update the progress bar and test block run time settings. |
| BlockN.seq | Template TestStand ™ sequence file copied N times to the target directory. N files are modified by the TPS Wizard (where N is the number of test blocks). The modified files contain all the sequences and steps necessary to implement the test block/test structure from data entered in the TPS Wizard. The user may have to modify the generated files to accommodate complex tests, and to add special to type and instrument steps. |
| Block0.seq | Template TestStand ™ sequence file copied to the target directory and modified by the TPS Wizard. Contains all the test program pre-performance checks. This file should be very similar across all test programs, however, |

-continued

| File | Purpose |
|---|---|
| | the user will have to edit the copied sequence file for a particular test adapter/UUT set up. |
| Settings.ini | Holds the column widths s |

The TPS Wizard data is held in a set structure:
Project Data is held in a single record which relates directly to the project information.

| Project Data |
|---|
| char *progamtitle |
| char *version |
| char *description |
| char *drawingnumber |

Test Block Data is held in a linked list of records:

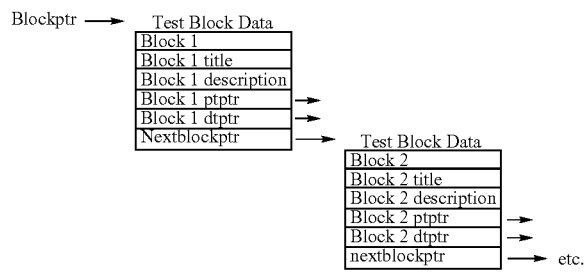

Test data is held in two separate lists for each test block: a performance test (pt) list and a diagnostic test (dt) list.

As discussed above, the TPS Wizard automates most of the process of generating a consistent, structured TestStand™ Test Program. A generated Test Program consists of:
  A series of TestStand sequence files (Main entry point and sub-blocks).
  A test limit file containing the measurement limit values for the tests.
  A diagnostic message file containing the messages used to diagnose the UUT.
  A Test Block selection file that allows the user to individually select test blocks to run.

The following illustrates the creation of a baseline TestStand™ Test Program using the present invention.

The present invention relates to a program as discussed above which reduces Test Program development work (anticipated to be up to two man weeks for a complex UUT) by significantly reducing the time required to generate TestStand Sequence files. Apart from the Test and Test Block entries within the sequence files, the program also automatically generates:
  Set-up sequences for Tests and Blocks.
  Clean-up sequences for Tests and Blocks.
  Test and Block pre and post-conditions.
  Progress bar pre-conditions.
  External Test Limit file.
  Block selection initialisation file.

The program also enables the Test Engineer to concentrate on the UUT test implementation within LabWIndows/CVI and improves maintainability by delivering a consistent and repeatable interface for test programs.

The program is stored on a CD-ROM and it is installed on a PC by following the steps below:
1. Insert the CD-ROM in to the CD-ROM Drive.
2. If Autorun is enabled on the PC go to step 5.
3. If Autorun is disabled, select Start>>Run . . .

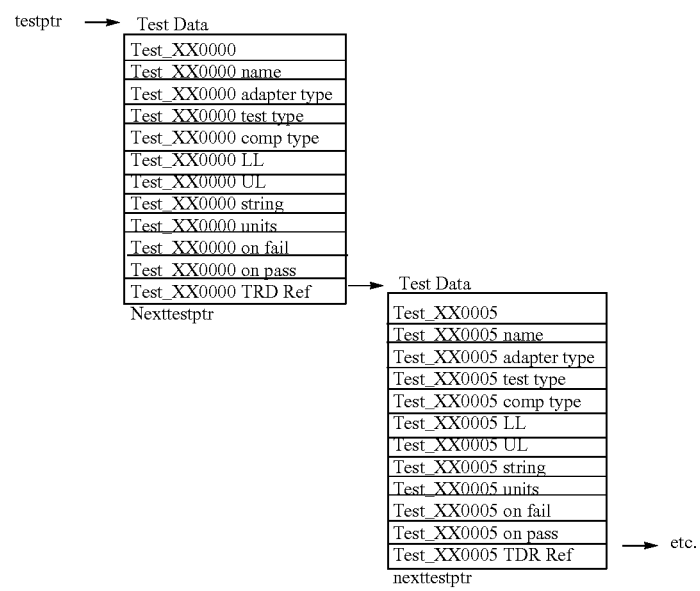

Figure 2:
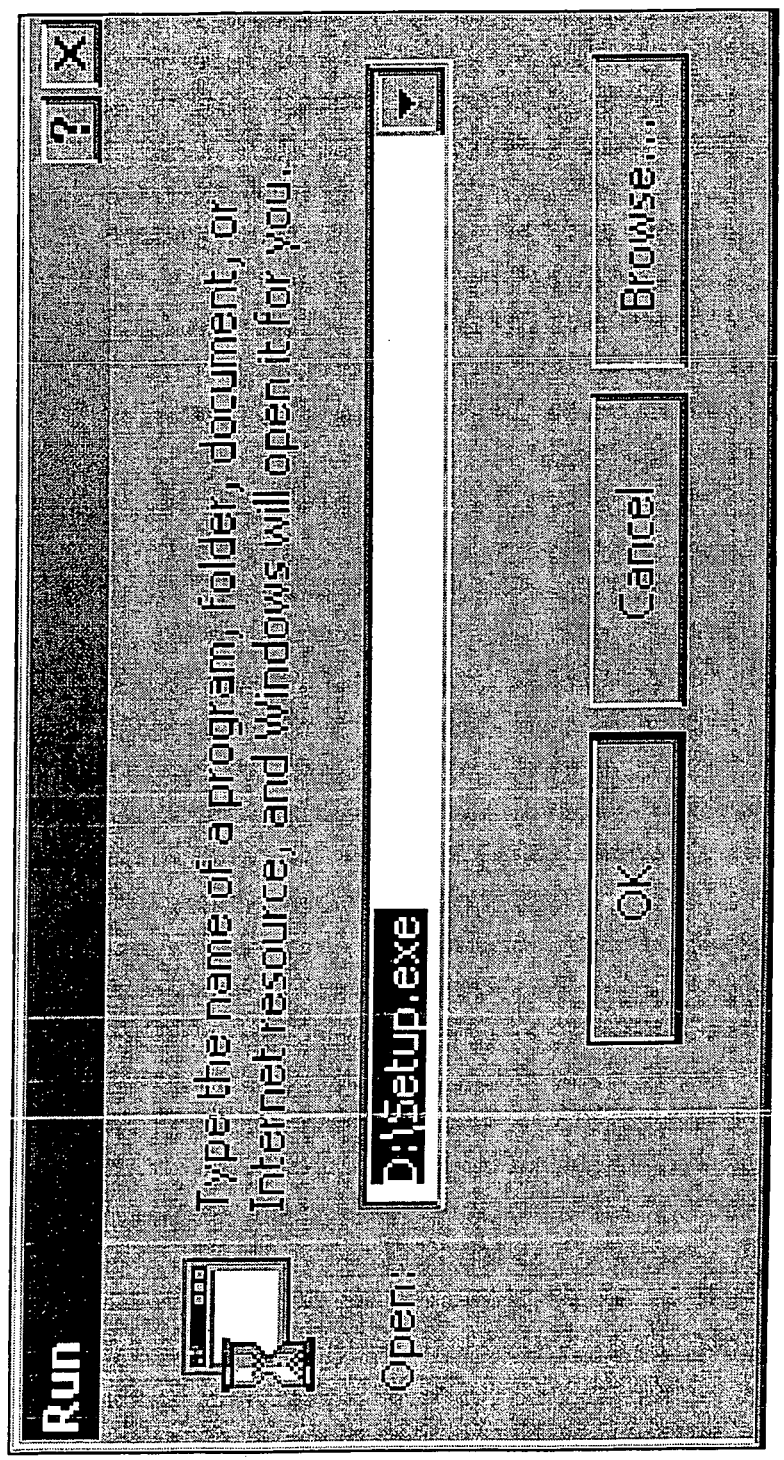
FIG. 2 illustrates a Run Setup.exe screen.

4. Type in D:\Setup.exe (where D: is the CD-ROM Drive) in the Open field and select OK (as shown in FIG. 2)

5. Follow the instructions that are shown on the screen.

Figure 3:
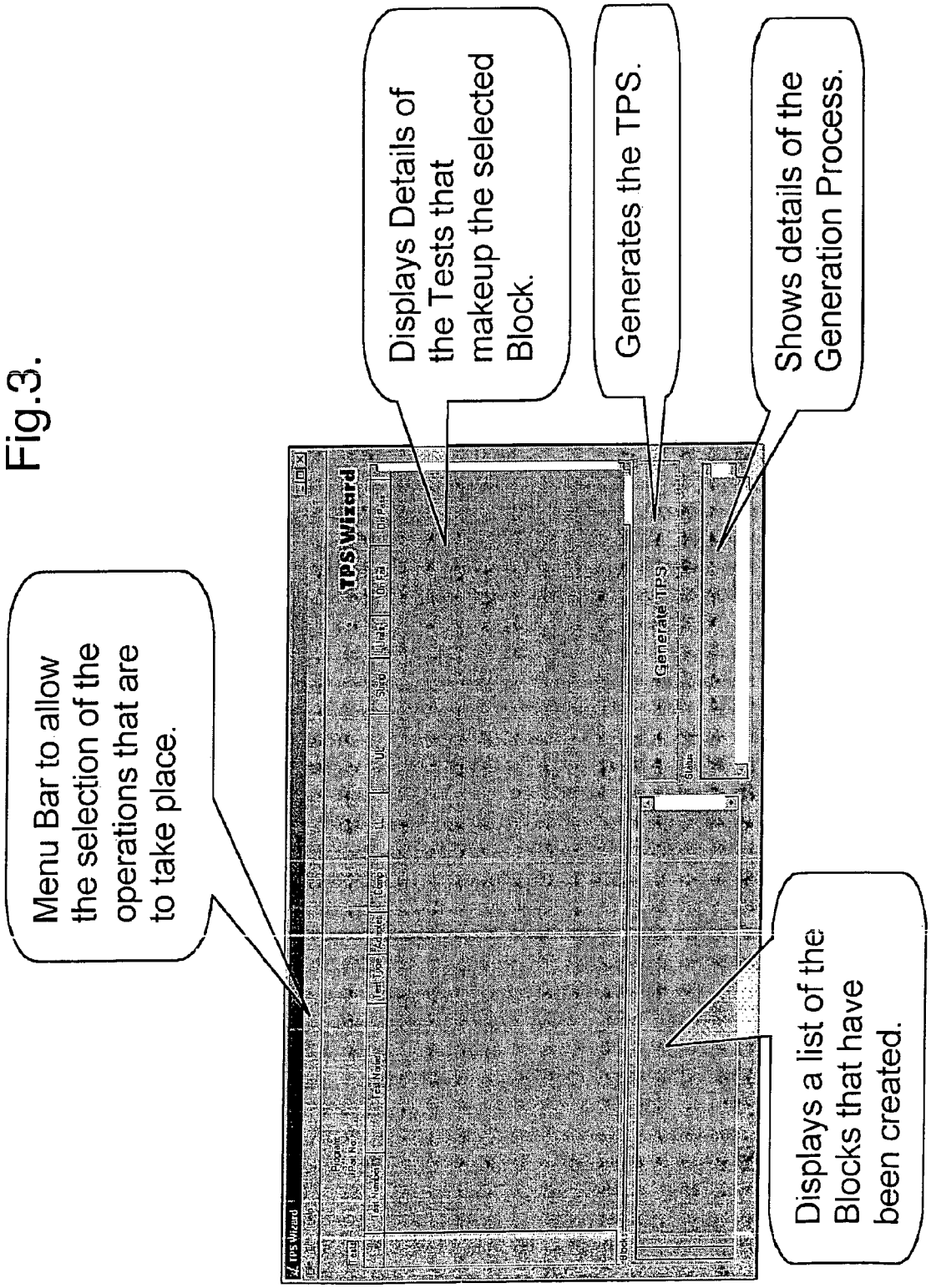
FIG. 3 illustrates a TPS Wizard startup screen.

Once installed, the TPS Wizard program is launched by double-clicking the Shortcut on the Desktop or by browsing to the path of the executable. Once invoked the panel shown in FIG. 3 will be displayed.

The application has a menu bar, which allows the following operations:

| Menu | Option | Description |
| --- | --- | --- |
| File | New . . . | Allows the creation of a new .tps file which describes the TPS to be generated. |
|  | Open . . . | Opens an existing .tps file. |
|  | Save . . . | Saves the details of the current TPS to be generated to a .tps file. |
|  | Save As . . . | Saves the details of the current TPS to be generated to a .tps file, allowing the naming of the file. |
|  | Close | Closes the TPS description. |
|  | Exit | Exits the TPS Wizard. |
| Edit | Edit info . . . | Allows the editing of the general TPS information. |
|  | Edit Block . . . | Allows the editing of the Test Blocks that makeup the TPS. |
|  | Edit Test . . . | Allows the editing individual Tests that makeup the Test Blocks. |
| Help | About | Displays information about the TPS Wizard. |

Figure 4:
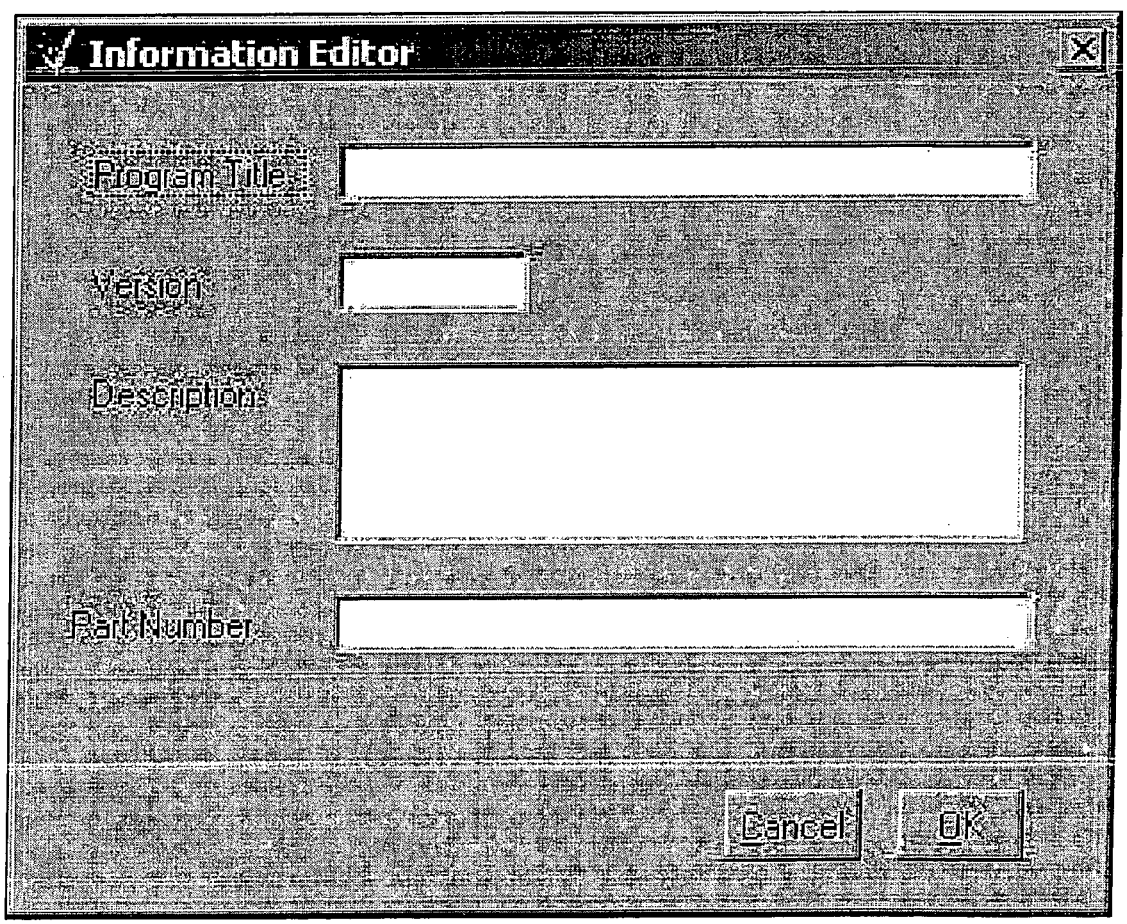
FIG. 4 illustrates an Information Editor screen.
Figure 5:
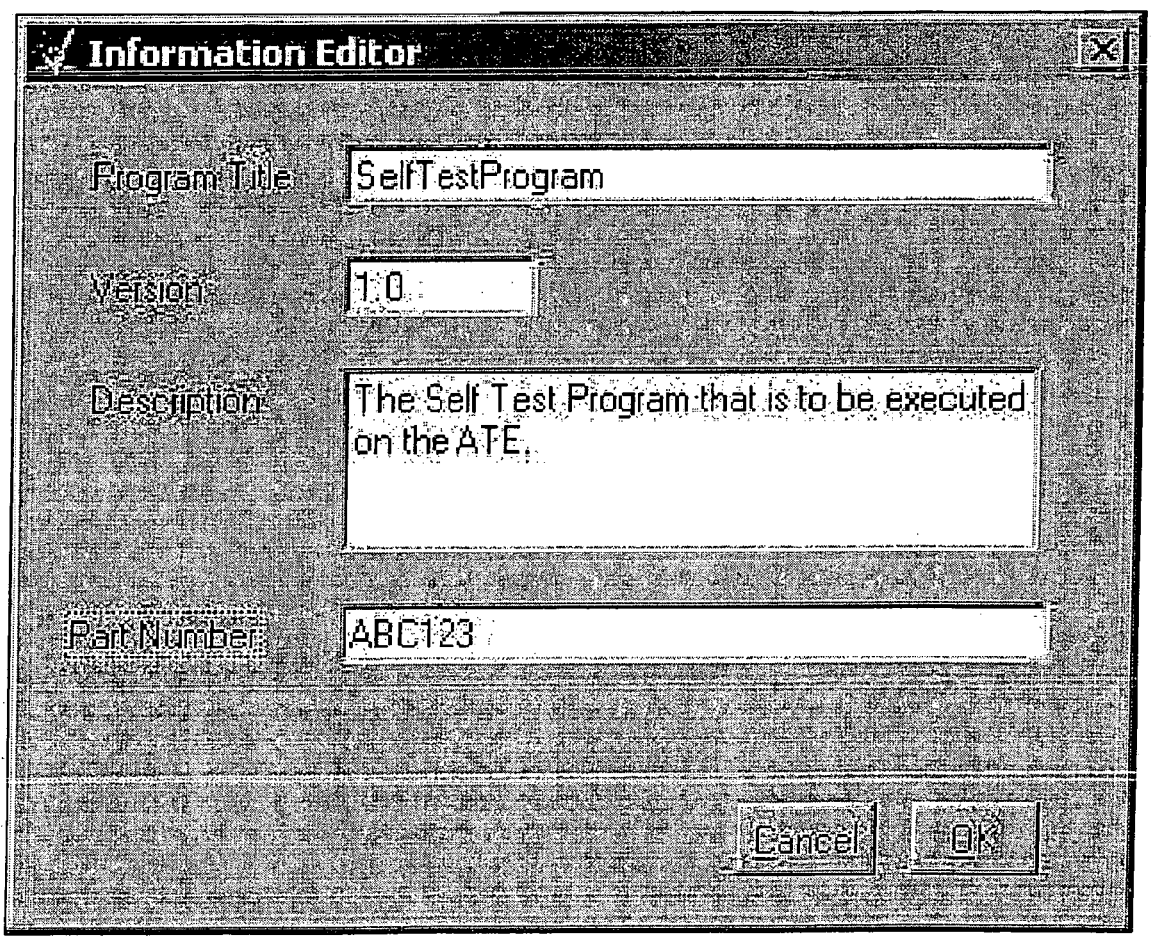
FIG. 5 illustrates a completed Information Editor screen.

In order to create a new Test Program Sequence (TPS), the user selects 'File'>>'New' and the Information Editor panel shown in FIG. 4 will be displayed. In the box 'Program Title', a descriptive title of the UUT should be entered. Label steps are created within the main sequence to show the 'Version'. A description of the TPS is to be entered and this description is set as the Station Global Program Description variable within the initialisation sequence. The part number of the UUT/TPS will form part of the sequence file names and the directory in which the program will reside. The completed panel should look similar to the one shown in FIG. 5.

Figure 6:
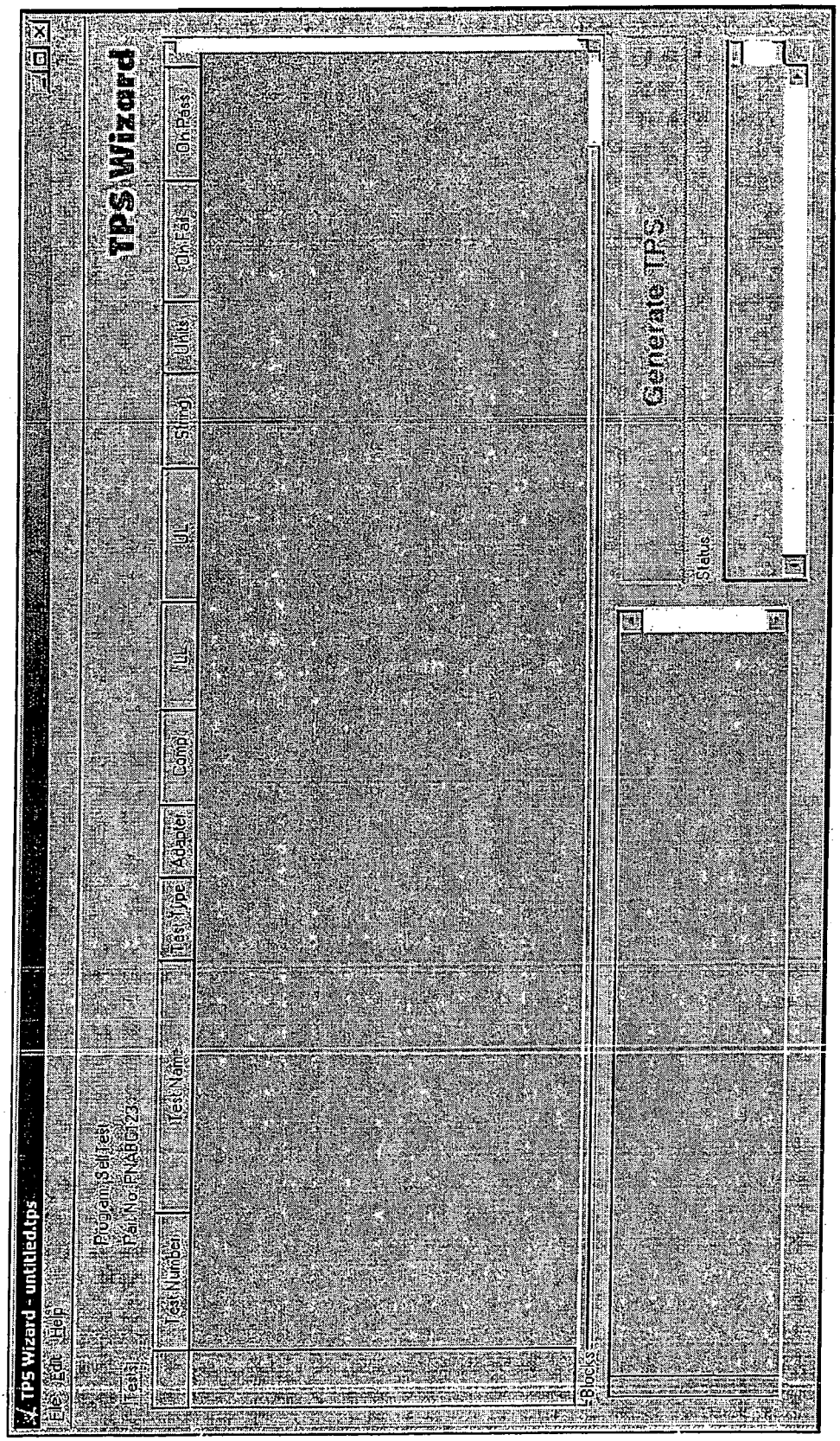
FIG. 6 illustrates a TPS Wizard updated main panel screen.

When 'OK' is selected, the Information Editor panel is closed and any changes made are accepted. (If 'Cancel' is selected, all changes are discarded.) The TPS Wizard main panel will then be updated to reflect the information as shown in FIG. 6.

Figure 7:
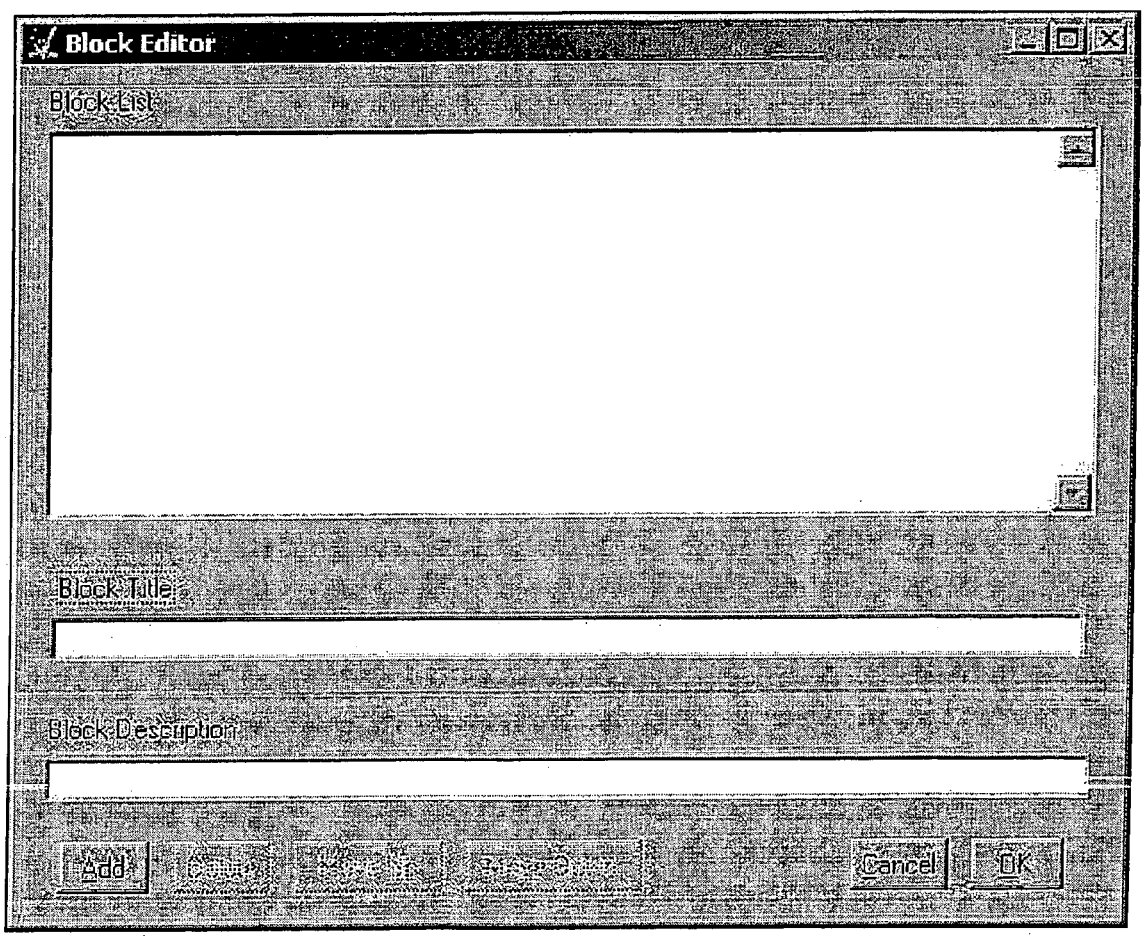
FIG. 7 illustrates a Block Editor panel screen.
Figure 8:
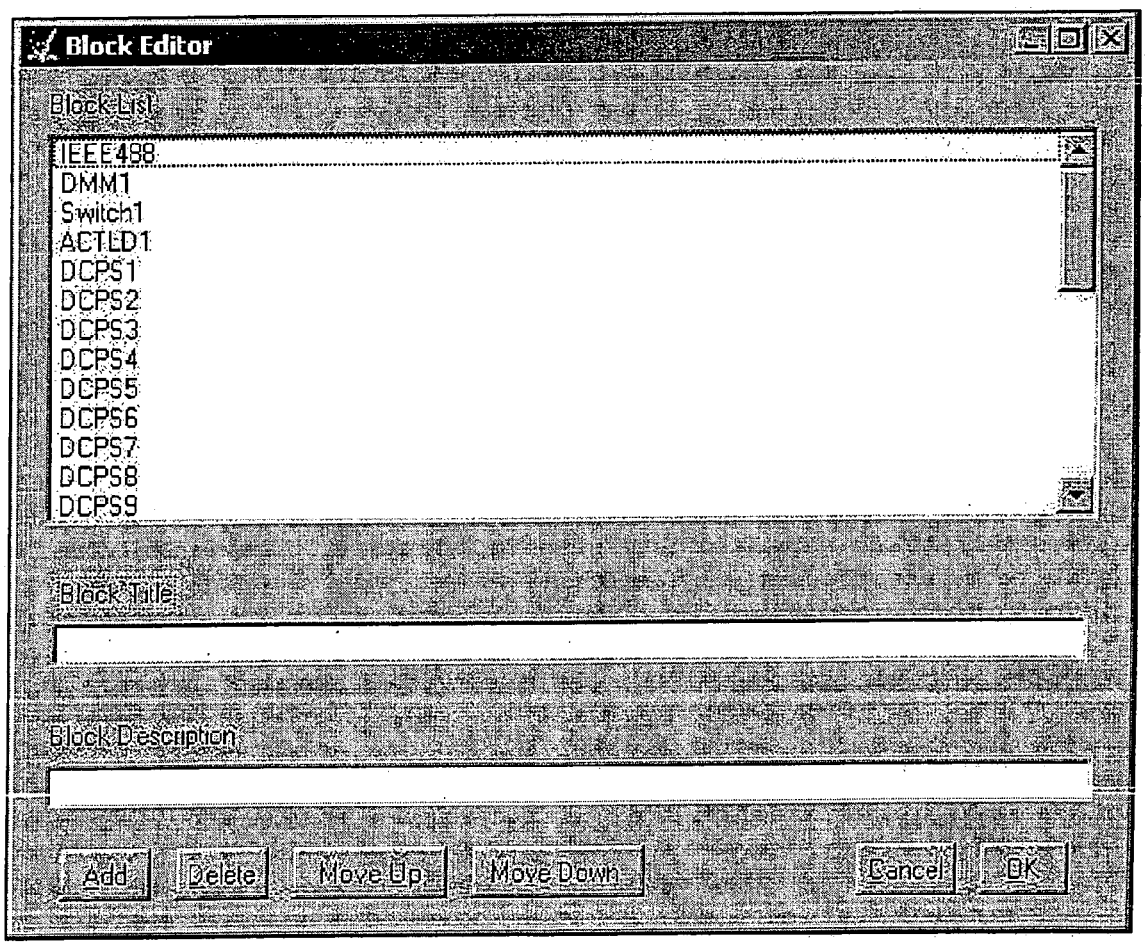
FIG. 8 is similar to FIG. 6 with the Blocks added.
Figure 9:
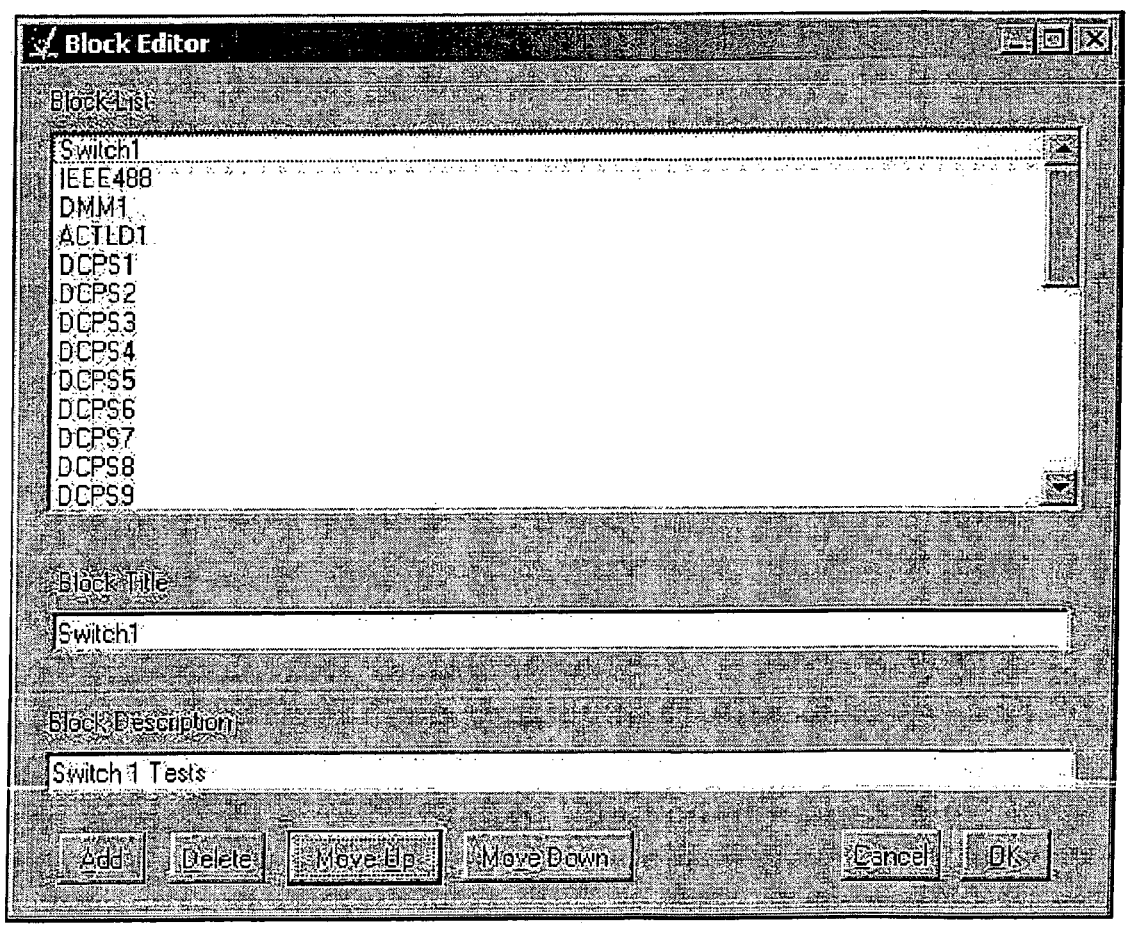
FIGS. 9 and 10 illustrate using 'Move Up' and 'Move Down' functions respectively.
Figure 10:
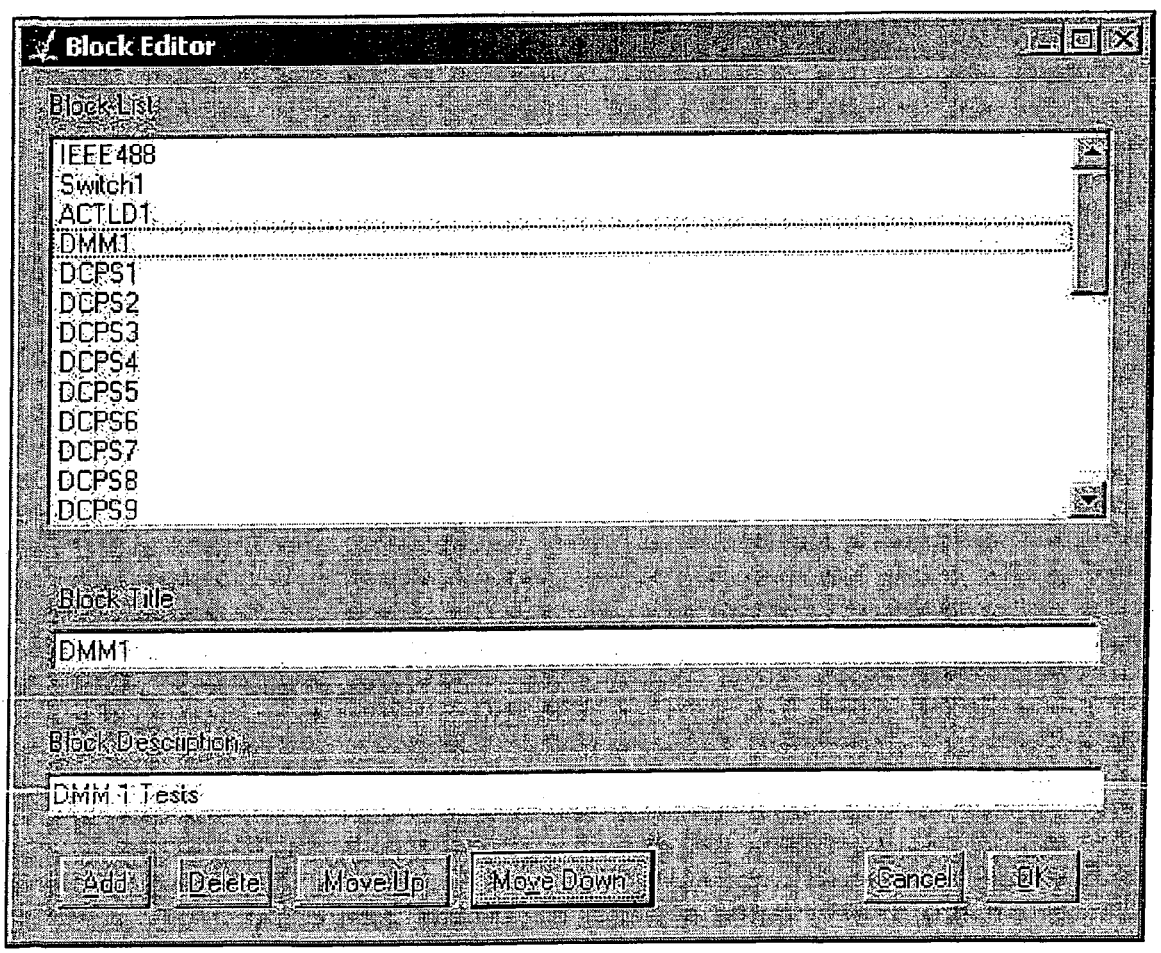
Figure 11:
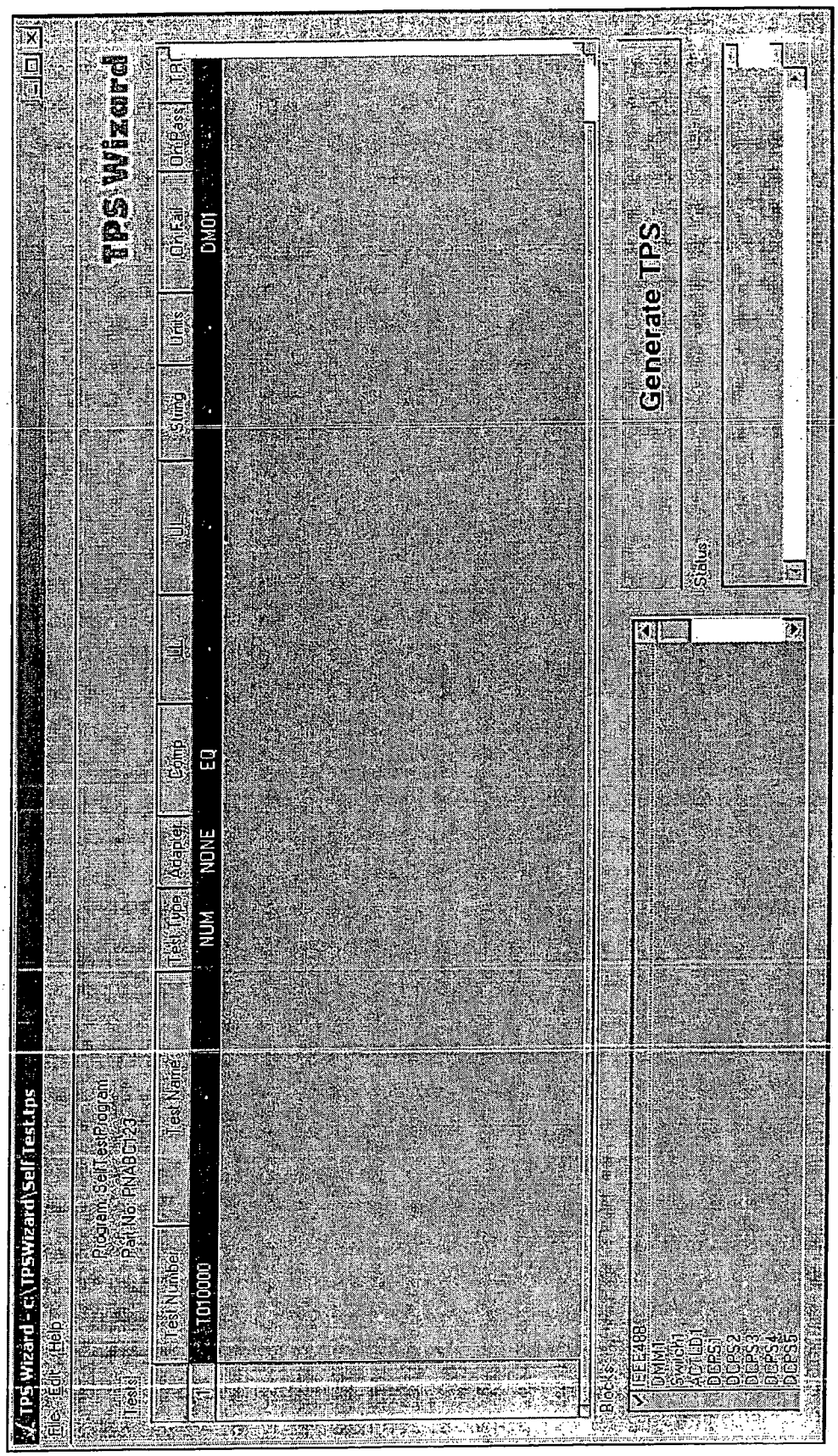
FIG. 11 is similar to FIG. 6 with Block details included.

By selecting 'Edit'>>'Edit Block', the Block Editor panel shown in FIG. 7 is shown. To add a new Test Block to the Block List, enter the title that the block is to be given into the Block Title field and a relative description into the Block Description field then click 'Add'. FIG. 8 illustrates the Block Editor panel with blocks added. A Block can be deleted by selecting it in the Block List and clicking 'Delete'. When there is more than one Test Block, it is possible to reorder the Blocks by moving them up or down the list. This reordering is done by selecting the relevant Test Block and then either clicking 'Move Up' (to move the selected Test Block up one position as shown in FIG. 9) or clicking 'Move Down' (to move the selected Test Block down one position as shown in FIG. 10). For example, in FIG. 9, the 'Switch 1' Block has been moved from its original position (FIG. 8) to the top of the Block List. Similarly, in FIG. 10, the 'DMM1' Block has been moved from its original position (FIG. 8) to below the 'ACTLD1' Block.

The test numbers are automatically renumbered when any change in the order of Blocks occurs.

Clicking on 'OK' accepts any changes made to the Block Editor panel and closes the panel (whereas clicking on 'Cancel' discards any changes and closes the panel) and updates the TPS Wizard main panel as shown in FIG. 10. In the update, one test is added to each of the Test Blocks by default.

Figure 12:
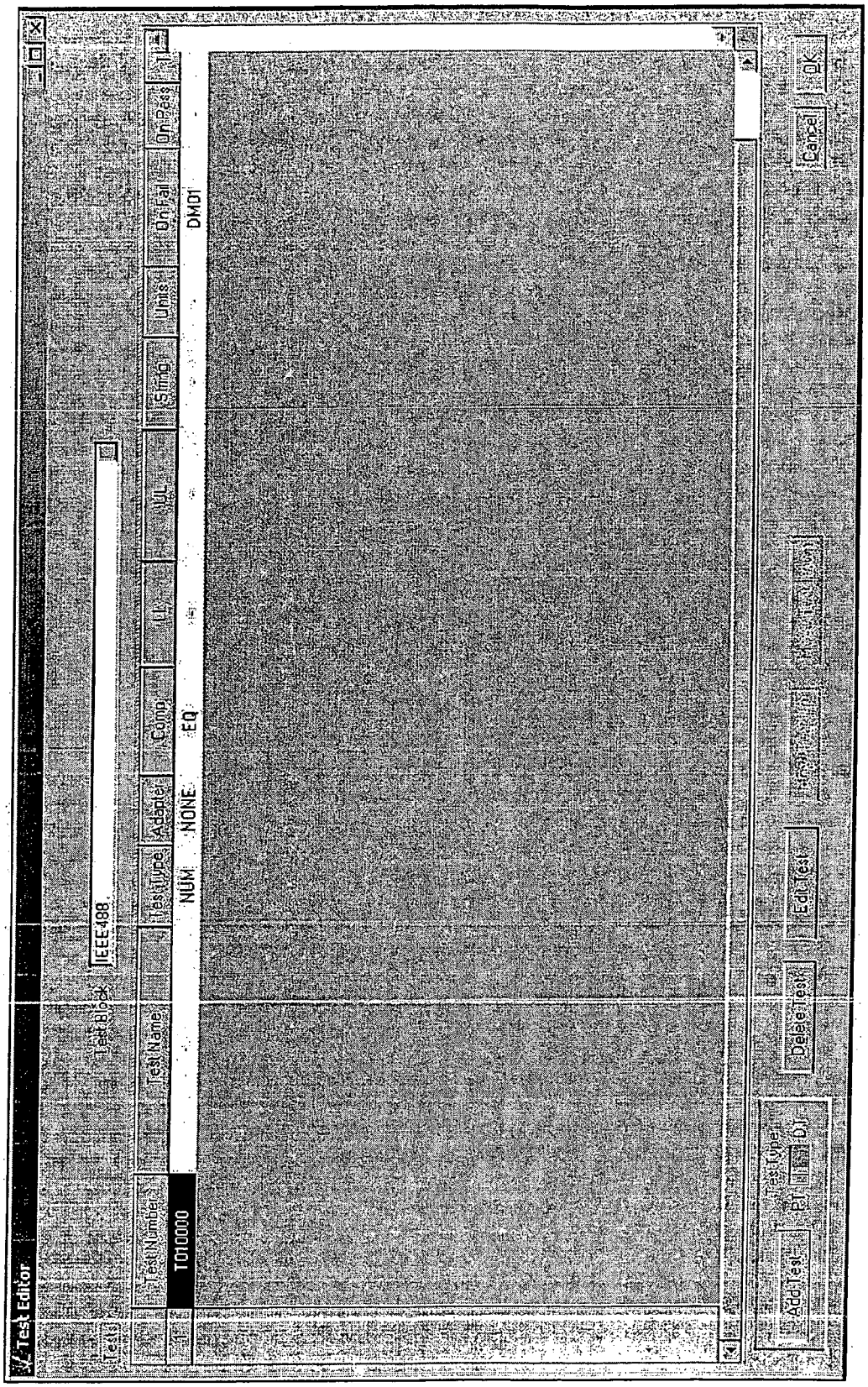
FIG. 12 illustrates a Test Editor panel screen.
Figure 13:
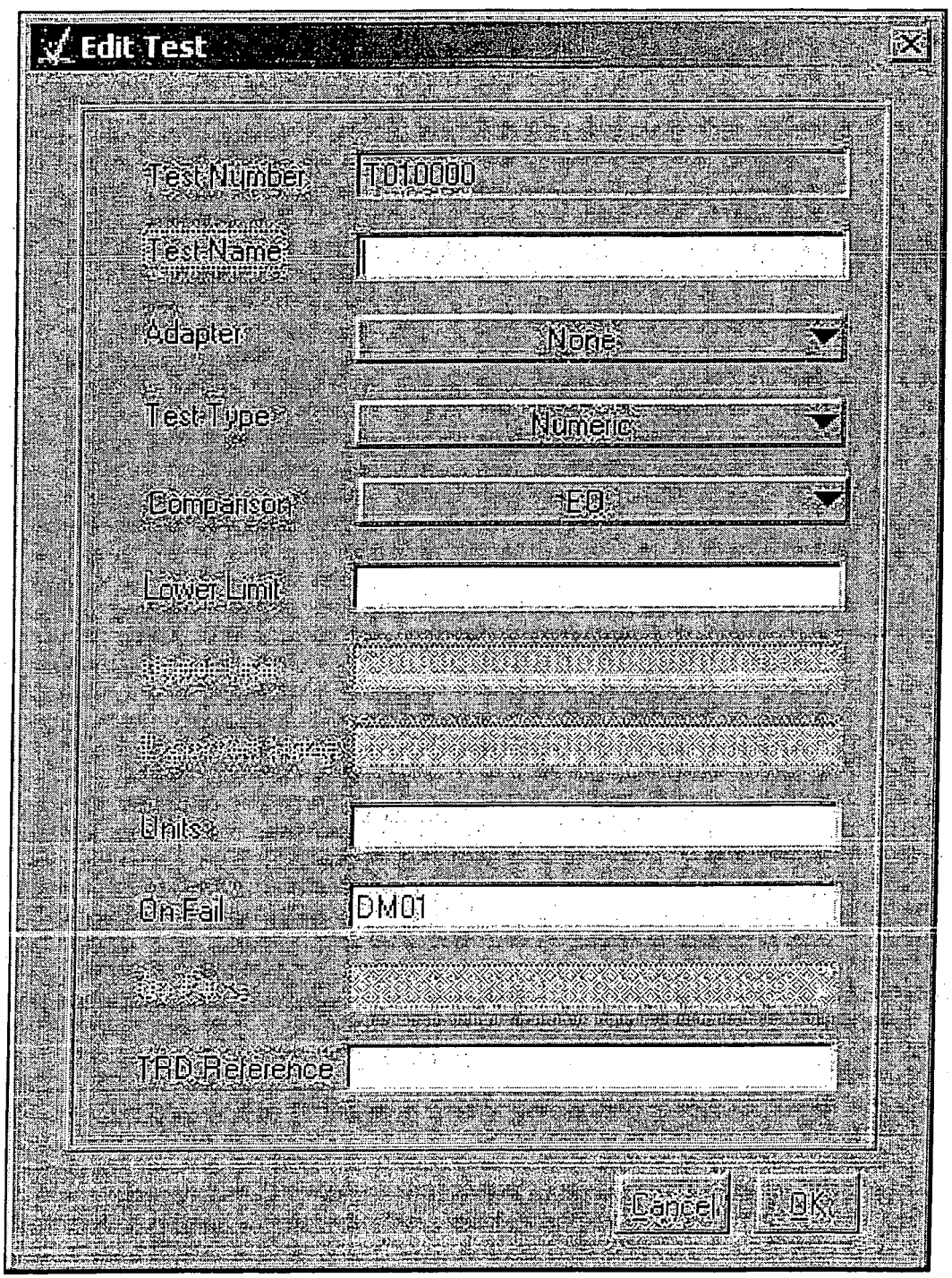
FIG. 13 illustrated an Edit Test panel screen.

Individual tests within a Test Block can be edited by selecting the Test Block from the Block List and selecting 'Edit'>>'Edit Test'. This brings up the Test Editor panel as shown in FIG. 12. The panel shown in FIG. 12 allows a new Test to be added, a Test to be deleted, or a Test to be edited. If a Test is to be edited, the Edit Test panel is displayed as shown in FIG. 13. The Edit Test panel can also be displayed by right-clicking on a specific Test in either the TPS Wizard main panel or the Test Editor panel.

As shown in FIG. 13, several fields are displayed. The Test Number field has a value which is fixed and is generated automatically. In the Test Name field, the Name displayed in the comment of the Test Sequence is to be entered. The Adapter field allows one of the following TestStand™ adapters to be selected:

C/CVI Standard Prototype Adapter

DLL Flexible Adapter

None

The Test Type field allows the selection of the type of test which is to take place, the options being:—

Numeric

String

Pass/Fail

The values available for Test Type selection depend on the Test Type selected as shown below:

| Test Type | Values Available |
| --- | --- |
| Numeric | GE |
|  | NE |
|  | GT |
|  | LT |
|  | GE |
|  | LE |
|  | GTLT |
|  | GELE |
|  | GELT |
|  | No Comparison |
| String | Case Sensitive |
|  | Ignore Case |
| Pass/Fail | No values (control is disabled) |

A Lower Limit field and an Upper Limit field can be set when the Test Type is set to Numeric. The units of measurement field for the test can only be set when the Test Type is set to Numeric.

An Expected String field can also be set when the Test Type is set to String.

For the On Fail field, a 'DMXX' is entered to display a Diagnostic Message and a Diagnostic Test Number of the form TMNXXXX_XX is also entered. The On Pass field control is always disabled for a Performance Test because if a Performance Test Passes, the test after it will always be executed next. However, should the Test being setup be a Diagnostic Test then this control will become active and the On Pass field is similar to the On Fail field.

The TRD Reference allows the entering of a reference to a particular section in a TRD which relates to the Test.

Once all the details have been entered into the TPS Wizard, the TestStand™ Test Program is created by selecting the 'Generate TPS' button. Details of the generation process will be shown within the status control of the main panel. The generated code is a partial TPS framework and will not execute if any test has been specified with a CVI or DLL Flexible Adapter. These adapter steps require manual input (DLL name, function name and parameters) from within the Sequence Editor.

The TPS Wizard generates the following files that obtain their name from the entries made in the Part Number and Program Title fields of the Information Editor Panel as described above:

| File Name (Example File Name) | Description |
| --- | --- |
| <Part Number>_Main_<Program Title>.seq (PNABC123_Main_SelfTestProgram.seq) | The main entry point for the TPS. |
| <Part Number>_Block00_<Program Title>.seq (PNABC123_Block00_SelfTestProgram.seq) | This block contains the pre-performance tests. |
| <Part Number>_BlockNN_<Program Title>.seq (PNABC123_Block21_SelfTestProgram.seq) | The test blocks that makeup the TPS. |
| <Part Number>_BlockSelect_<Program Title>.ini (PNABC123_BlockSelect_SelfTestProgram.ini) | The details required allowing the selection of test blocks that are to be executed. |
| <Part Number>_Diagnostics_<Program Title>.txt (PNABC123_Diagnostics_SelfTestProgram.txt) | The file containing the diagnostic messages for the TPS. |
| <Part Number>_LimitsFile_<Program Title>.txt (PNABC123_LimitsFile_SelfTestProgram.txt) | The file containing the details of limits for tests that require them. |
| <Part Number>_MessagePopups_<Program Title>.seq (PNABC123_MessagePopUps_SelfTestProgram.seq) | This sequence file contains the Message popups that are to be shown during the execution of the TPS. |
| <Part Number>_ReadFormattedText_<Program Title>.seq (PNABC123_ReadFormattedText_SelfTestProgram.seq) | Reads in a Diagnostic Message from a specified Diagnostic Text file. |

The directory in which the files that makeup a TPS are to reside, is also made up of the Program Title and Part Number. It takes the following format:

<Part Number>_<ProgramTitle>

For example, the TPS referred to herein will reside in the PNABC123_SelftestProgram directory. The Directory containing the TPS is put in the ATPS folder under the directory defined in the TD_ROOTPATH environment variable.

The TPS Wizard generates the skeleton code for a TestStand Test Program. The following edits to the generated sequence files will convert the code to a functioning program that will run with the Test Executive:

<PN>_Block00_<ProgramTitle>seq

Test Block 0 contains the standard pre-performance tests for the particular system which is to be tested. Each Test Block should have a 'fixed' format across all ATPs.

In Test T000000, modify the TPSH Part Number [Observation parameter to the function call step <Display GO NOGO message>].

In Test T000005, modify the Air Publication (or equivalent) number that refers to the UUT bonding and insulation tests. [Observation parameter to the function call step <Display GO NOGO message>].

In Mainsequence, modify the TPS Hook Up Instructions [Observation parameter to the function call step <Display TPS Hook Up Instructions>].

In Test T000010, modify the call to the ITA signature resistor test [CallITASignatureTest in CVIStandard Prototype Adapter Test step <Test TPSH Signature Resistor>.] Update the correct limits for Test000010 in <PN>_LimitsFile_<ProgramTitle>.txt.

In Test T000015, modify the call to the ITA signature resistor test [CallITASignatureTest in CVIStandard Prototype Adapter Test step <Test STTO Word>.] Update the correct limits for Test000015 in <PN>_LimitsFile_<ProgramTitle>.txt.

In Mainsequence, modify the UUT Hook Up Instructions [Observation parameter to the function call step <Display UUT Hook Up Instructions>].

In Test T000020, modify the call to the ITA signature resistor test [CallITASignatureTest in CVIStandard Prototype Adapter Test step <Test UUT Signature Resistor>.] Update the correct limits for Test000020 in <PN>_LimitsFile_<ProgramTitle>.txt.

In Test T000025, modify the call to the ITA signature resistor test [CallITASignatureTest in CVIStandard Prototype Adapter Test step <Test 28V Input Resistance>.] Update the correct limits for Test000025 in <PN>_LimitsFile_<ProgramTitle>.txt <PN>_Main_<ProgramTitle>.seq In TestProgram Sequence—Setup StepGroup, provide the dll calls for steps <Initialise UUT>, <Apply UUT Power>steps. In TestProgram Sequence—Main StepGroup, for each test block call step provide/override the default setting in the step pre and post expressions for the test progress and block run time, for example, "Approximate run time for block=X minutes" may become " . . . =2 minutes" and StationGlobal.TestProgress=value (this value defaults to n*100/N, where n is the test block number for the step, and N is the total number of test blocks).

<PN>_Block01-BlockMN_<ProgramTitle>.seq

For all test block sequence files, complete the coding by adding the necessary instrumentation steps and/or dll calls to instrument drivers, within the PT and DT Sequences (if applicable).

<PN>_Diagnostics_<ProgramTitle>.txt

Add all diagnostic messages in the form of <DMXX>Line1,Line2,Line3,etc where DMXX is the diagnostic code, entered in the TPS Wizard editor, and commas act as line separators.

If a Performance Test (PT) fails then a test failure message popup is displayed with option buttons. If the operator selects the CONTINUE option then the program proceeds to either display a Diagnostic Message (DMXX), or to run a further Diagnostic Test (DT). DTs, therefore, are conditional tests; they only execute if the Performance Test (PT) to which they relate fails. The relationship between PTs and DTs is reflected in the numbering system, for example, T010005_01 is a DT related to PT T010005.

A PT failure may invoke a series of DTs to run depending upon the pass or fail result of each DT. Eventually all DT paths must terminate with a Diagnostic Message. If a PT failure identifies the faulty module, then it can invoke a Diagnostic Message (DMXX) directly, without recourse to DTs.

If a PT passes, then the TPS Wizard assumes that execution will continue to the next PT in the sequence. If anything else is required, for example, on pass jump to T010070 (from T010005), then this must be configured manually within the sequence editor.

When adding a test using the TPS Wizard editor, the PT/DT switch is activated if the current highlighted test is the last PT in the sequence. Set the switch to PT, if the next test to be added is a PT. Set the switch to. DT if the next test should be a Diagnostic Test. If any test, other than the last PT, is highlighted then the switch is inhibited, and the highlighted test indicates the type of the next test to be added. i.e. if a PT is selected then a PT will be added, if a DT is selected then a DT will be added.

The Edit Test Dialog is displayed on selecting the "Add Test" button. The only differences between a PT and DT are that:

1. For a DT, the Test Number field is editable, for a PT it is auto generated and not editable.
2. The On Pass field is enabled on the Edit Test Dialog.

The onus is on the user to correctly insert, assign and maintain diagnostic test numbers and diagnostic messages. Specifying a non-existent/incorrect DT or DM will result in TestStand errors when the generated test program is executed.

Whilst the present invention has been described with reference to TestStand which defines a specific format, it will be appreciated that other specific formats can also be used, for example, Atlas.

Moreover, the invention can also be interfaced with another format, for example, Visual Basic or C.

The invention claimed is:

1. A method of generating a test program structure in a computing device, comprising:
   in the computing device:
      receiving test requirement data through a user interface;
      generating, in a processor, a plurality of sequence files of a test program based on the test requirement data, wherein each test program includes sequence files having data associated with one of performance tests, diagnostic tests, and test limits, respectively;
      modifying at least one of the sequence files based on a selected software adapter; and
      generating the test program including performance and diagnostic tests from the generated and modified sequence files, wherein the data of the respective sequence files is converted to program code for execution by the selected software adapter,
      wherein when a performance test fails during execution of the test program:
         identifying a faulty sequence file associated with the failed performance test; and
         displaying a diagnostic message associated with the faulty sequence file,
      wherein if the failed performance test does not invoke display of a diagnostic message, identifying the faulty sequence file by executing at least one linked list of diagnostic tests associated with the failed performance test, where a subsequent diagnostic test of the linked list is invoked based on a result of a previous diagnostic test of the linked list.

2. The method of claim 1, wherein modifying at least one of the sequence files includes adjusting an order of the at least one sequence files in a test block.

3. The method of claim 1, wherein generating the plurality of sequence files comprises:
   modifying template files based on the received test requirement data.

4. The method of claim 1, comprising:
   generating directory test blocks, wherein each directory test block includes at least one sequence file.

5. The method of claim 4, wherein each directory test block includes at least one sub-sequence test block.

6. The method of claim 4, comprising:
   generating plural linked lists for each test block.

7. The method of claim 6, comprising:
   generating a performance test linked list for each test block.

8. The method of claim 4, comprising:
   calculating an approximate run-time for each test block.

9. The method of claim 4, comprising:
   calculating a test progress value $$\frac{n*100}{N}$$

for the test program, where n is a test block number, and N is a total number of test blocks.

10. A non-transitory computer readable medium for performing a method of generating a test program structure, the non-transitory computer readable medium having program code stored thereon such that when the non-transitory computer readable medium is in communicable contact with a computer, the computer is caused to execute the method comprising:
   receiving test requirement data through a user interface;
   generating, in a processor, a plurality of sequence files of a test program based on the test requirement data, wherein each test program includes sequence files having data associated with one of performance tests, diagnostic tests, and test limits, respectively;
   modifying at least one of the sequence files based on a selected software adapter;
   generating the test program including performance and diagnostic tests from the generated and modified sequence files, wherein the data of the respective sequence files is converted to program code for execution by the selected software adapter, wherein when a performance test fails during execution of the test program: identifying a faulty sequence file associated with the failed performance test; and displaying a diagnostic message associated with the faulty sequence file, wherein if the failed performance test does not invoke display of a diagnostic message, identifying the faulty sequence file by executing at least one linked list of diagnostic tests associated with the failed performance test, where a subsequent diagnostic test of the linked list is invoked based on a result of a previous diagnostic test of the linked list.

11. The non-transitory computer readable medium of claim 10, wherein modifying at least one of the sequence files includes adjusting an order of the at least one sequence files in a test block.

12. The non-transitory computer readable medium of claim 10, wherein generating the plurality of sequence files comprises: modifying template files based on the received test requirement data.

13. The non-transitory computer readable medium of claim 10, wherein the method comprises: generating directory test blocks, wherein each directory test block includes at least one sequence file.

14. The non-transitory computer readable medium of claim 13, wherein the method comprises: generating plural linked lists for each test block.

15. The non-transitory computer readable medium of claim 14, wherein the method comprises: generating a performance test linked list for each test block.

16. The non-transitory computer readable medium of claim 13, wherein the method comprises: calculating an approximate run-time for each test block.

17. The non-transitory computer readable medium of claim 13, wherein the method comprises: calculating a test progress value $$\frac{n*100}{N}$$

for the test program, where n is a test block number, and N is a total number of test blocks.

18. A system of generating a test program structure, comprising:
an interface for receiving test requirement data;
a processor configured to:
a plurality of sequence files of a test program based on the test requirement data, wherein each test program includes sequence files having data associated with one of performance tests, diagnostic tests, and test limits, respectively;
modifying at least one of the sequence files based on a selected software adapter; and
generating the test program including performance and diagnostic tests from the generated and modified sequence files, wherein the data of the respective sequence files is converted to program code for execution by the selected software adapter,
wherein when a performance test fails during execution of the test program the processor is configured to:
identify a faulty sequence file associated with the failed performance test; and
generate a diagnostic message associated with the faulty sequence file,
wherein if the failed performance test does not invoke display of a diagnostic message, identifying the faulty sequence file by executing at least one linked list of diagnostic tests associated with the failed performance test, where a subsequent diagnostic test of the linked list is invoked based on a result of a previous diagnostic test of the linked list; and
a display for displaying the diagnostic message.

* * * * *